(12) United States Patent
Fujii

(10) Patent No.: US 11,440,353 B2
(45) Date of Patent: Sep. 13, 2022

(54) HEAVY DUTY TIRE

(71) Applicant: SUMITOMO RUBBER INDUSTRIES, LTD., Kobe (JP)

(72) Inventor: Riho Fujii, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 143 days.

(21) Appl. No.: 17/108,701

(22) Filed: Dec. 1, 2020

(65) Prior Publication Data

US 2021/0197621 A1 Jul. 1, 2021

(30) Foreign Application Priority Data

Dec. 27, 2019 (JP) .............................. JP2019-237646

(51) Int. Cl.
  *B60C 9/28* (2006.01)
  *B60C 11/03* (2006.01)
  *B60C 11/12* (2006.01)

(52) U.S. Cl.
  CPC ............ *B60C 11/0332* (2013.01); *B60C 9/28* (2013.01); *B60C 11/1204* (2013.01); *B60C 2009/283* (2013.01); *B60C 2011/0346* (2013.01); *B60C 2011/1213* (2013.01); *B60C 2200/06* (2013.01)

(58) Field of Classification Search
  CPC ............ B60C 2200/06; B60C 11/0332; B60C 11/0083; B60C 9/28
  See application file for complete search history.

(56) References Cited

U.S. PATENT DOCUMENTS

2018/0222255 A1* 8/2018 Maehara .................. B60C 3/04

FOREIGN PATENT DOCUMENTS

JP 2018-127199 A 8/2018

* cited by examiner

*Primary Examiner* — Cedrick S Williams
(74) *Attorney, Agent, or Firm* — Birch, Stewart, Kolasch & Birch LLP

(57) ABSTRACT

In a tire 2, in a normal state, a profile of a tread surface 22 includes a crown circular arc as a circular arc representing a profile of a portion including an equator PC, and the crown circular arc has a radius of not less than 1600 mm and not greater than 2000 mm. On a ground-contact surface 52 obtained when a load is applied to the tire 2 in the normal state and the tread surface 22 is brought into contact with a flat road surface, an ultra-light load shape index F30 is higher than a light load shape index F60, the ultra-light load shape index F30 is not less than 1.10 and not greater than 1.20, and the light load shape index F60 is not less than 1.04 and not greater than 1.14.

12 Claims, 6 Drawing Sheets

HEAVY DUTY TIRE

TECHNICAL FIELD

The present invention relates to heavy duty tires.

BACKGROUND ART

Life performance is one of the important performances in heavy duty tires which are mounted on commercial vehicles such as trucks, buses, and the like. In a tire mounted on a drive shaft of a commercial vehicle, the contact pressure in a crown region including the equator tends to be high, and wear is likely to occur in the crown region.

Depending on an area where tires are used, a tire may be used under a light load condition (for example, a load that is 60% or less of a normal load) due to load regulation. In this case, the tire runs in a state where the contact pressure at each shoulder side is low. The contour line at each circumferential direction side of the ground-contact surface tends to bulge in the crown region, and wear tends to progress in the crown region.

In order to improve life performance, development of a tire that evenly wears the entirety of a tread thereof even when used under a light load condition is in progress (for example, PATENT LITERATURE 1 below).

CITATION LIST

Patent Literature

PATENT LITERATURE 1: Japanese Laid-Open Patent Publication No. 2018-127199

SUMMARY OF INVENTION

Technical Problem

In the heavy duty tire disclosed in PATENT LITERATURE 1 described above, the position of an inflection point between a crown circular arc and a shoulder circular arc is controlled in a contour of a tread surface in a state where the internal pressure of the tire is adjusted to 5% of a normal internal pressure. However, under a light load condition, a peak of contact pressure is expected to occur at the inflection point, depending on the magnitude of the radius of the crown circular arc, and there is a concern that wear may progress near the inflection point. Technology to evenly wear the entirety of a tread under a light load condition has not been established.

The present invention has been made in view of the above circumstances, and an object of the present invention is to provide a heavy duty tire that has excellent uneven wear resistance under a light load condition and can contribute to improvement of life performance thereof.

Solution to Problem

A heavy duty tire according to an aspect of the present invention includes a tread having a tread surface that comes into contact with a road surface. In the tire in a normal state where the tire is mounted on a normal rim, an internal pressure of the tire is adjusted to a normal internal pressure, and no load is applied to the tire, a profile of the tread surface includes a crown circular arc as a circular arc representing a profile of a portion including an equator, and the crown circular arc has a radius of not less than 1600 mm and not greater than 2000 mm. When: a ratio of an equator ground-contact length measured along the equator, to a reference ground-contact length at a position corresponding to a width that is 70% of a maximum ground-contact width, on a ground-contact surface obtained when a load is applied to the tire in the normal state and the tread surface is brought into contact with a flat road surface, is defined as a shape index; the shape index obtained when the load is 30% of a normal load is defined as an ultra-light load shape index; and the shape index obtained when the load is 60% of the normal load is defined as a light load shape index, the ultra-light load shape index is higher than the light load shape index, the ultra-light load shape index is not less than 1.10 and not greater than 1.20, and the light load shape index is not less than 1.04 and not greater than 1.14.

Preferably, in the heavy duty tire, when the shape index obtained when the load is the normal load is defined as a heavy load shape index, the heavy load shape index is lower than the light load shape index, and the heavy load shape index is not less than 1.00 and not greater than 1.10.

Preferably, the heavy duty tire further includes a belt located inward of the tread in a radial direction. The belt includes a plurality of layers stacked in the radial direction, and each of the layers includes a large number of belt cords aligned with each other. The plurality of layers include a first reference layer having a largest width in an axial direction, and a second reference layer stacked radially outward of the first reference layer. An angle of the belt cords in each of the first reference layer and the second reference layer relative to an equator plane is not less than 14° and not greater than 17°.

Preferably, in the heavy duty tire, at least four circumferential grooves aligned in an axial direction are formed on the tread, thereby forming at least five land portions. Among the at least five land portions, land portions including ends of the tread surface are shoulder land portions, land portions located inward of the shoulder land portions in the axial direction are middle land portions, and a land portion located inward of the middle land portions in the axial direction is a crown land portion. A ratio of a width of each middle land portion to a width of the crown land portion is not less than 0.95 and not greater than 1.05, and a ratio of a width of each shoulder land portion to the width of the crown land portion is not less than 0.85 and not greater than 0.95.

Preferably, in the heavy duty tire, on each of the middle land portions and the crown land portion, a sipe is formed so as to traverse the land portion. In the sipe, an edge shape of an opening open on the tread surface has a zigzag portion that extends in a zigzag manner by repeating peaks and valleys. In a depth direction of the sipe, the edge shape of the opening is substantially retained, and first displacement portions in each of which a position of the zigzag portion is displaced to one side in a longitudinal direction of the sipe and second displacement portions in each of which the position of the zigzag portion is displaced to another side in the longitudinal direction of the sipe are repeated.

Preferably, in the heavy duty tire, a ratio of a thickness of the tire at each end of the tread surface to a thickness of the tire at the equator is not less than 1.30 and not greater than 1.35.

Advantageous Effects of Invention

In the heavy duty tire according to the present invention, the entirety of the tread is evenly worn under a light load condition. The tire has excellent uneven wear resistance under the light load condition and can contribute to improvement of life performance thereof.

DESCRIPTION OF EMBODIMENTS

The following will describe in detail the present invention based on preferred embodiments with appropriate reference to the drawings.

In the present invention, a state where a tire is mounted on a normal rim, the internal pressure of the tire is adjusted to a normal internal pressure, and no load is applied to the tire is referred to as a normal state. In the present invention, unless otherwise specified, the dimensions and angles of each component of the tire are measured in the normal state.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

Figure 1:
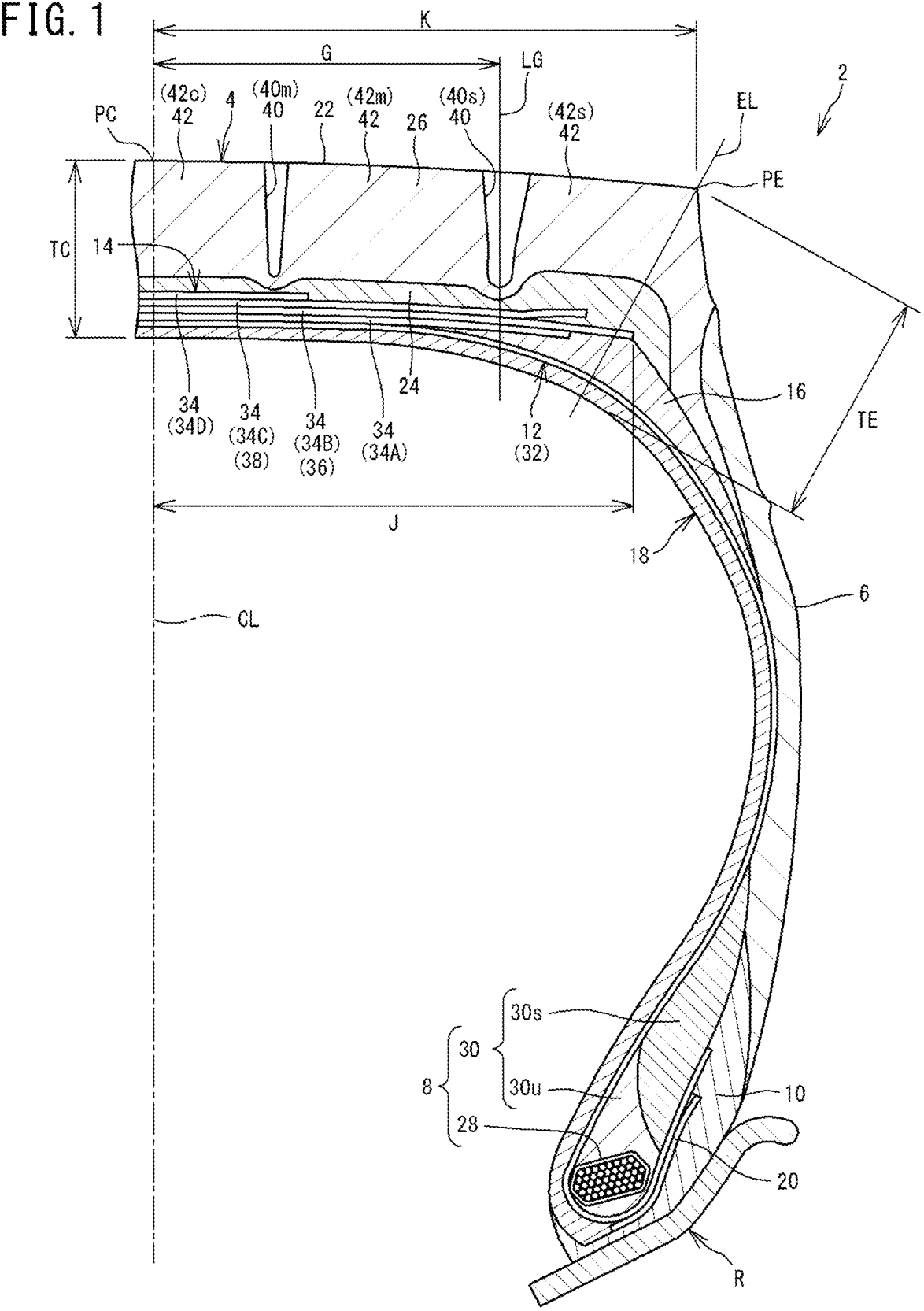
FIG. 1 is a cross-sectional view showing a part of a heavy duty tire according to an embodiment of the present invention.

FIG. 1 shows a part of a heavy duty tire 2 (hereinafter, sometimes referred to simply as "tire 2") according to an embodiment of the present invention. The tire 2 is a tire for trucks and buses.

FIG. 1 shows a part of a cross-section of the tire 2 along a plane including the rotation axis of the tire 2. In FIG. 1, the right-left direction is the axial direction of the tire 2, and the up-down direction is the radial direction of the tire 2. The direction perpendicular to the surface of the sheet of FIG. 1 is the circumferential direction of the tire 2. In FIG. 1, an alternate long and short dash line CL represents the equator plane of the tire 2. In FIG. 1, the tire 2 is mounted on a rim R (normal rim). The tire 2 shown in FIG. 1 is in a normal state.

The tire 2 includes a tread 4, a pair of sidewalls 6, a pair of beads 8, a pair of chafers 10, a carcass 12, a belt 14, a pair of cushion layers 16, an inner liner 18, and a pair of reinforcing layers 20.

The tread 4 comes into contact with a road surface at an outer surface 22 thereof, that is, at a tread surface 22 thereof.

The tread 4 has the tread surface 22 that comes into contact with a road surface. Reference character PC represents the point of intersection of the tread surface 22 and the equator plane CL. The point of intersection PC corresponds to the equator of the tire 2.

In FIG. 1, reference character PE represents an end of the tread surface 22. In the tire 2, when the ends PE of the tread surface 22 cannot be identified from the appearance, the outer ends in the axial direction of a ground-contact surface obtained when the normal load is applied to the tire 2 in the normal state and the tread 4 is brought into contact with a flat surface at a camber angle of 0° are defined as the ends PE of the tread surface 22.

The tread 4 includes a base layer 24 and a cap layer 26. The base layer 24 is located outward of the belt 14 in the radial direction. The base layer 24 is formed from a crosslinked rubber for which low heat generation properties are taken into consideration. The cap layer 26 is located outward of the base layer 24 in the radial direction. The cap layer 26 is formed from a crosslinked rubber for which wear resistance and grip performance are taken into consideration.

Each sidewall 6 is connected to an end of the tread 4. The sidewall 6 extends radially inward from the end of the tread 4. The sidewall 6 is formed from a crosslinked rubber.

Each bead 8 is located radially inward of the sidewall 6. The bead 8 includes a core 28 and an apex 30.

The core 28 extends in the circumferential direction. The core 28 includes a wound wire made of steel. The apex 30 is located radially outward of the core 28. The apex 30 extends radially outward from the core 28.

The apex 30 includes an inner apex $30u$ and an outer apex $30s$. The outer apex $30s$ is located outward of the inner apex $30u$ in the radial direction. Each of the inner apex $30u$ and the outer apex $30s$ is formed from a crosslinked rubber. The outer apex $30s$ is more flexible than the inner apex $30u$.

Each chafer 10 is located axially outward of the bead 8. The chafer 10 is located radially inward of the sidewall 6. The chafer 10 comes into contact with the rim R. The chafer 10 is formed from a crosslinked rubber.

The carcass 12 is located inward of the tread 4, each sidewall 6, and each chafer 10. The carcass 12 extends between and on one bead 8 and the other bead 8. The carcass 12 has a radial structure. The carcass 12 includes at least one carcass ply 32. The carcass 12 of the tire 2 is composed of one carcass ply 32. In the tire 2, the carcass ply 32 is turned up around the core 28 of each bead 8 from the inner side toward the outer side in the axial direction.

The carcass ply 32 includes a large number of carcass cords aligned with each other, which are not shown. In the tire 2, the material of the carcass cords is steel. A cord formed from an organic fiber may be used as each carcass cord.

The belt 14 is located inward of the tread 4 in the radial direction. The belt 14 is located radially outward of the carcass 12. In the tire 2, from the viewpoint of preventing occurrence of damage at each end of the belt 14, at least a distance of 10 mm in the axial direction from the end of the belt 14 to the end PE of the tread surface 22 is ensured.

The belt 14 includes a plurality of layers 34 stacked in the radial direction. The belt 14 of the tire 2 includes four layers 34.

In the tire 2, among the four layers 34, a second layer 34B located between a first layer 34A and a third layer 34C in the radial direction has the largest width in the axial direction. The third layer 34C is located radially outward of the second layer 34B having the largest width in the axial direction and is stacked directly on the second layer 34B. In the tire 2, the third layer 34C has the second largest width in the axial direction next to the second layer 34B. A fourth layer 34D located outward of the third layer 34C in the radial direction, that is, a fourth layer 34D located at the outermost side in the radial direction, has the smallest width in the axial direction.

In the tire 2, among the plurality of layers 34 included in the belt 14, the second layer 34B is a first reference layer 36 of the belt 14 which has the largest width in the axial direction, and the third layer 34C is a second reference layer 38 of the belt 14 which is stacked radially outward of the first reference layer 36. When the second layer 34B is the first reference layer 36 and the third layer 34C is the second reference layer 38, the first layer 34A is a third reference layer and the fourth layer 34D is a a fourth reference layer.

Each of the layers 34 included in the belt 14 includes a large number of belt cords aligned with each other. The number of belt cords in each layer 34 is not less than 20 and not greater than 40 per a width of 50 mm of the layer 34 in a cross-section of the layer 34 along a plane perpendicular to the direction in which the belt cords extend. The material of the belt cords is steel.

Each cushion layer 16 is located between the belt 14 and the carcass 12 at the end of the belt 14. The cushion layer 16 supports the end of the belt 14 from the inner side in the radial direction. The cushion layer 16 is formed from a crosslinked rubber for which low heat generation properties are taken into consideration.

The inner liner 18 is located inward of the carcass 12. The inner liner 18 forms an inner surface of the tire 2. The inner liner 18 is formed from a crosslinked rubber that has an excellent air blocking property.

Each reinforcing layer 20 is located at a bead 8 portion. The reinforcing layer 20 is located outward of the bead 8 in the axial direction. The reinforcing layer 20 is located between the carcass ply 32 and the chafer 10. The inner end of the reinforcing layer 20 is located radially inward of the core 28. The outer end of the reinforcing layer 20 is located between the end of the turned-up carcass ply 32 and the core 28 in the radial direction.

The reinforcing layer 20 includes a large number of filler cords aligned with each other, which are not shown. The material of the filler cords is steel.

In the tire 2, circumferential grooves 40 continuously extending in the circumferential direction are formed on the tread 4. In the tire 2, at least four circumferential grooves 40 aligned in the axial direction are formed on the tread 4. Accordingly, in the tread 4, at least five land portions 42 are formed. In the tire 2 shown in FIG. 1, four circumferential grooves 40 are formed on the tread 4, and five land portions 42 are formed.

Figure 2:
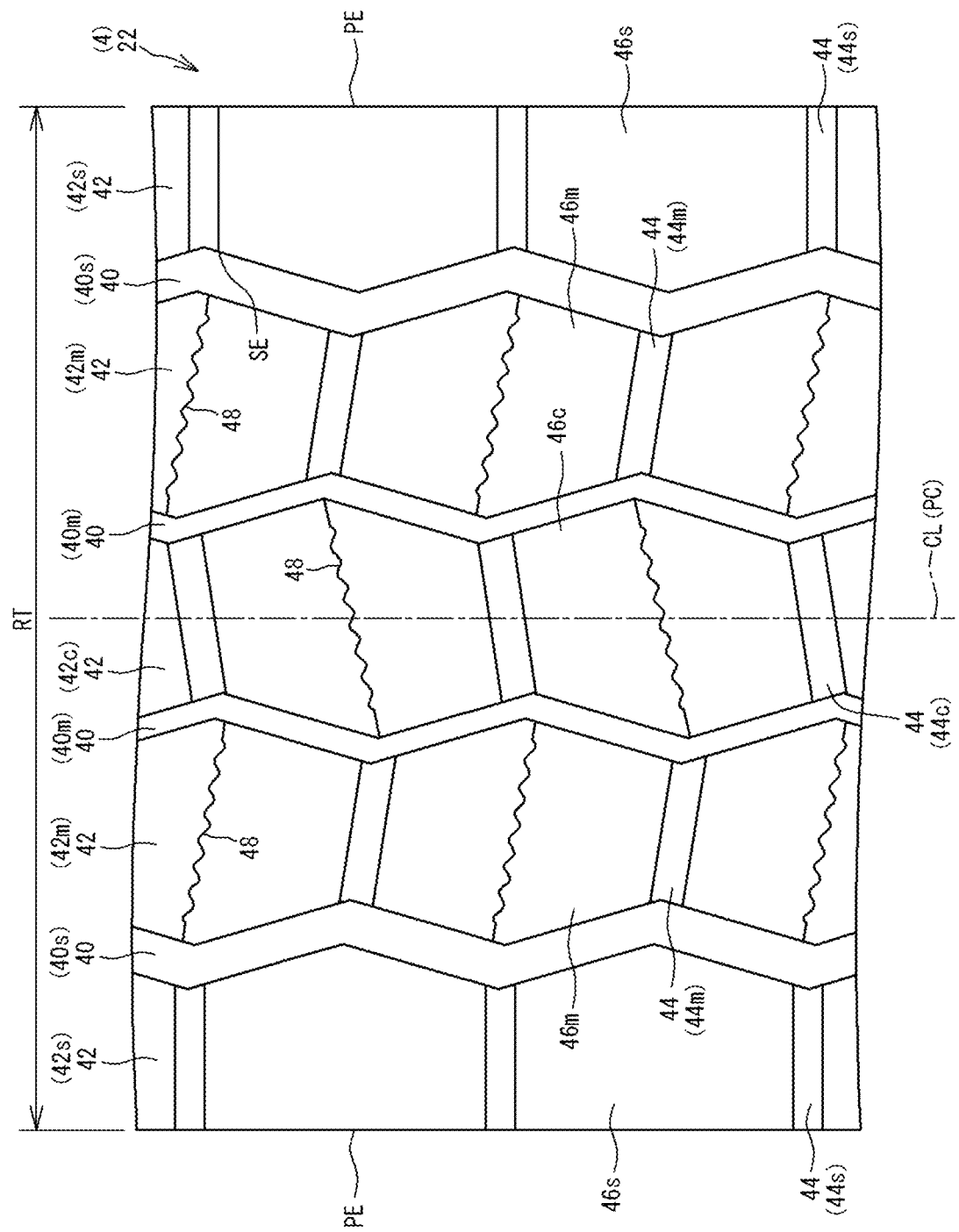
FIG. 2 is a development showing a part of a tread surface of the tire.

FIG. 2 is a development of the tread surface 22. In FIG. 2, the right-left direction is the axial direction of the tire 2, and the up-down direction is the circumferential direction of the tire 2. The direction perpendicular to the surface of the sheet of FIG. 2 is the radial direction of the tire 2.

In FIG. 2, a double-headed arrow RT represents the width of the tread surface 22. The width RT is represented as the distance, in the axial direction from one end PE of the tread surface 22 to the other end PE of the tread surface 22, measured along the tread surface 22.

In the tire 2, the width of each circumferential groove 40 is represented as the shortest distance from one edge of the circumferential groove 40 to the other edge of the circumferential groove 40. The width of each land portion 42 is represented as the distance, in the axial direction from one edge of the land portion 42 to the other edge of the land portion 42, measured along the tread surface 22. In the case where the width of the land portion 42 changes in the circumferential direction, the average value of the maximum width and the minimum width of the land portion 42 is used as the width of the land portion 42.

In the tire 2, among the four circumferential grooves 40, circumferential grooves 40s located at the outer sides in the axial direction, that is, circumferential grooves 40s near the ends PE of the tread surface 22, are shoulder circumferential grooves. Circumferential grooves 40m located inward of the shoulder circumferential grooves 40s in the axial direction are middle circumferential grooves. In the tire 2, a circumferential groove may be further provided between the right and left middle circumferential grooves 40m. In this case, this circumferential groove is referred to as a center circumferential groove.

Each middle circumferential groove 40m continuously extends in the circumferential direction in a zigzag manner. The middle circumferential groove 40m may be formed as a groove that extends in the circumferential direction in a straight manner.

Each shoulder circumferential groove 40s continuously extends in the circumferential direction in a zigzag manner. The shoulder circumferential groove 40s may be formed as a groove that extends in the circumferential direction in a straight manner.

In the tire 2, from the viewpoint of contribution to drainage performance and traction performance, the width of each circumferential groove 40 is preferably not less than 1% and not greater than 10% of the width RT of the tread surface 22. The depth of the circumferential groove 40 is preferably not less than 13 mm and not greater than 25 mm.

In the tire 2, the width of each shoulder circumferential groove 40s is larger than the width of each middle circumferential groove 40m. The width of each shoulder circumferential groove 40s may be smaller than the width of each middle circumferential groove 40m, or may be equal to the width of each middle circumferential groove 40m. The width of each circumferential groove 40 is determined as appropriate according to the specifications of the tire 2.

In the tire 2, the depth of each shoulder circumferential groove 40s is equal to the depth of each middle circumferential groove 40m. Each shoulder circumferential groove 40s may be deeper than each middle circumferential groove 40m, or may be shallower than each middle circumferential groove 40m. The depth of each circumferential groove 40 is determined as appropriate according to the specifications of the tire 2.

As described above, the five land portions 42 are formed in the tread 4 of the tire 2. As described above, the circumferential grooves 40 continuously extending in the circumferential direction in a zigzag manner are formed in the tire 2. In each land portion 42, portions having a wide width (hereinafter, also referred to as maximum width portions) and portions having a narrow width (hereinafter, also referred to as minimum width portions) are alternately formed in the circumferential direction.

In the tire 2, among the five land portions 42, land portions 42s located at the outer sides in the axial direction are shoulder land portions. The shoulder land portions 42s include the ends PE of the tread surface 22. Land portions 42m located inward of the shoulder land portions 42s in the axial direction are middle land portions. A land portion 42c located inward of the middle land portions 42m in the axial direction is a crown land portion. As shown in FIG. 2, the crown land portion 42c of the tire 2 is located on the equator PC.

In the tire 2, the five land portions 42 include a crown land portion 42c, a pair of middle land portions 42m, and a pair of shoulder land portions 42s. The middle circumferential grooves 40m are present between the crown land portion 42c and the middle land portions 42m. The shoulder circumferential grooves 40s are present between the middle land portions 42m and the shoulder land portions 42s. Axial grooves 44 are formed on each land portion 42 of the tire 2 so as to traverse the land portion 42.

In the tire 2, the width of each axial groove 44 may be equal to the width of each circumferential groove 40, may be smaller than the width of each circumferential groove 40, or may be larger than the width of each circumferential groove 40. The width of each axial groove 44 is determined as appropriate according to the specifications of the tire 2.

In the tire 2, the depth of each axial groove 44 may be equal to the depth of each circumferential groove 40, may be larger than the depth of each circumferential groove 40, or may be smaller than the depth of each circumferential groove 40. The depth of each axial groove 44 is determined as appropriate according to the specifications of the tire 2.

An axial groove 44c (hereinafter, also referred to as crown axial groove) is formed on the crown land portion 42c so as to traverse the crown land portion 42c. The crown axial groove 44c extends between one middle circumferential groove 40m and the other middle circumferential groove 40m.

A plurality of crown axial grooves 44c are formed on the crown land portion 42c. Accordingly, a plurality of crown blocks 46c are formed in the crown land portion 42c so as to be arranged at intervals in the circumferential direction. The crown land portion 42c includes the plurality of crown blocks 46c aligned in the circumferential direction. In the tire 2, the crown land portion 42c may be composed of a projection that is continuous in the circumferential direction.

An axial groove 44m (hereinafter, also referred to as a middle axial groove) is formed on each middle land portion 42m so as to traverse the middle land portion 42m. The middle axial groove 44m extends between the middle circumferential groove 40m and the shoulder circumferential groove 40s.

A plurality of middle axial grooves 44m are formed on each middle land portion 42m. Accordingly, a plurality of middle blocks 46m are formed in the middle land portion 42m so as to be arranged at intervals in the circumferential direction. The middle land portion 42m includes the plurality of middle blocks 46m aligned in the circumferential direction. In the tire 2, the middle land portion 42m may be composed of a projection that is continuous in the circumferential direction.

An axial groove 44s (hereinafter, also referred to as a shoulder axial groove) is formed on each shoulder land portion 42s so as to traverse the shoulder land portion 42s. The shoulder axial groove 44s extends between the shoulder circumferential groove 40s and the end PE of the tread surface 22.

A plurality of shoulder axial grooves 44s are formed on each shoulder land portion 42s. Accordingly, a plurality of shoulder blocks 46s are formed in the shoulder land portion 42s so as to be arranged at intervals in the circumferential direction. The shoulder land portion 42s includes the plurality of shoulder blocks 46s aligned in the circumferential direction. In the tire 2, the shoulder land portion 42s may be composed of a projection that is continuous in the circumferential direction.

In the tire 2, a sipe 48 is formed on a maximum width portion of each crown block 46c, which forms a part of the crown land portion 42c, so as to traverse the crown block 46c. A sipe 48 is formed on a maximum width portion of each middle block 46m, which forms a part of the middle land portion 42m, so as to traverse the middle block 46m. As shown in FIG. 2, on each shoulder block 46s which forms a part of the shoulder land portion 42s, no sipe 48 that traverses the shoulder block 46s is formed.

Figure 3:
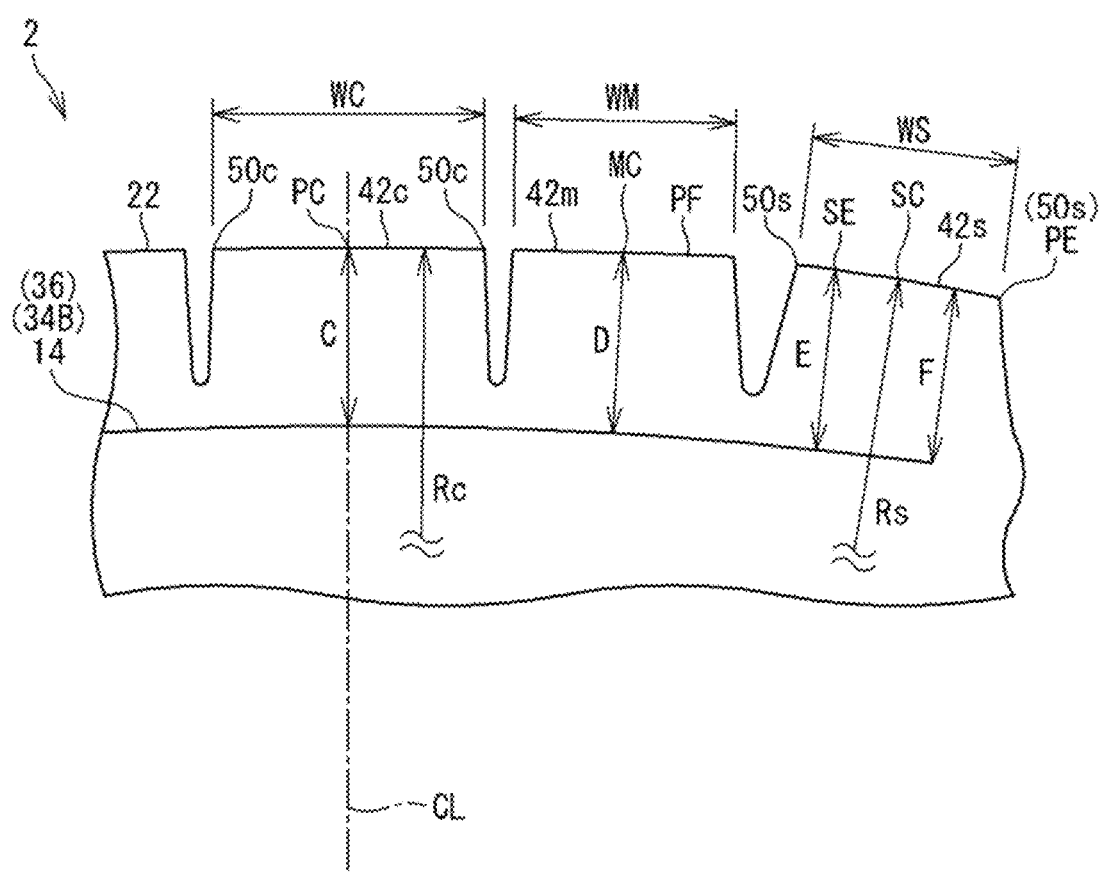
FIG. 3 is a cross-sectional view showing profiles of the tread surface and a belt.

FIG. 3 shows a part of the tread 4 of the tire 2 shown in FIG. 1. In FIG. 3, the right-left direction is the axial direction of the tire 2, and the up-down direction is the radial direction of the tire 2. The direction perpendicular to the surface of the sheet of FIG. 3 is the circumferential direction of the tire 2.

FIG. 3 shows a profile of the tread surface 22 and a profile of the radially outer surface of the second layer 34B having the largest width in the axial direction among the plurality of layers 34 included in the belt 14, that is, of the first reference layer 36 (hereinafter, also referred to as a profile of the belt 14), of the tire 2 in the normal state. The profile of the tread surface 22 and the profile of the belt 14 can be specified, for example, using a cross-sectional image of the tire 2 taken by a computer tomography method using X-rays (hereinafter, X-ray CT method). In this case, the cross-sectional image of the tire 2 taken by the X-ray CT method is captured in CAD (computer-aided design), and the profile of the tread surface 22 and the profile of the belt 14 are specified on this CAD. If the profile of the radially outer surface of the second layer 34B cannot be specified in this cross-sectional image, the profile of the radially outer surface of the second layer 34B, that is, the profile of the belt 14, is specified by drawing a line along a belt cord included in the second layer 34B, at a tread 4 side portion of the belt cord.

In the tire 2, of the profile of the tread surface 22, a profile of a portion including the equator PC (hereinafter, also referred to as a crown region) is represented by a circular arc having a center at the inner side of this profile in the radial direction. In the tire 2, the circular arc representing the profile of the crown region is referred to as a crown circular arc. In FIG. 3, an arrow denoted by reference character Rc represents the radius of the crown circular arc. Although not shown, the center of the crown circular arc is located on the equator plane CL. In the tire 2, the radius Rc is specified by the radius of a circular arc that passes through right and left edges 50c of the crown land portion 42c and the equator PC.

In the tire 2, of the profile of the tread surface 22, a profile of each of portions axially outward of the crown region (hereinafter, also referred to side regions) is represented by another circular arc (hereinafter, also referred to as a side circular arc) different from the crown circular arc representing the profile of the crown region.

In FIG. 3, an arrow denoted by reference character Rs represents the radius of the side circular arc. In the tire 2, the side circular arc has a radius Rs smaller than the radius Rc of the crown circular arc. In the tire 2, the ratio (Rs/Rc) of the radius Rs to the radius Rc is preferably not less than 0.2 and preferably not greater than 0.4. In FIG. 3, reference character PF represents the boundary between the side circular arc and the crown circular arc. The side circular arc and the crown circular arc are tangent to each other at the boundary PF. The boundary PF is an inflection point of the profile of the tread surface 22. In the tire 2, the radius Rs is specified by the radius of a circular arc that passes through right and left edges 50s of the shoulder land portion 42s and a center SC of the shoulder land portion 42s.

Figure 4:
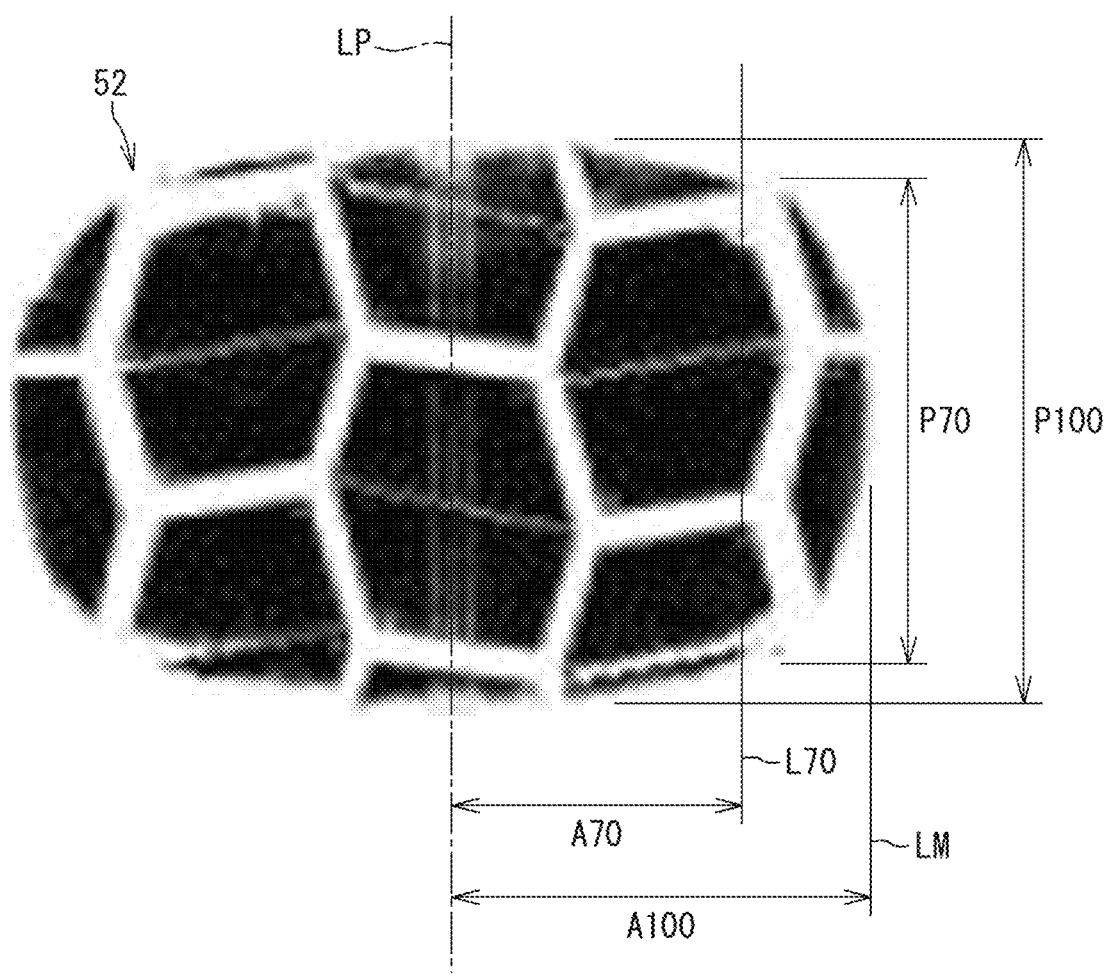
FIG. 4 shows an image of a ground-contact surface of the tire.

FIG. 4 shows a ground-contact surface 52, of the tire 2, which is in contact with a road surface. In FIG. 4, the up-down direction corresponds to the circumferential direction of the tire 2, and the right-left direction corresponds to the axial direction of the tire 2. The direction perpendicular to the surface of the sheet of FIG. 4 corresponds to the radial direction of the tire 2.

The ground-contact surface 52 shown in FIG. 4 is obtained by applying a load to the tire 2 in the normal state and bringing the tread surface 22 into contact with a flat road surface, using a tire ground-contact shape measuring device (not shown). For obtaining the ground-contact surface 52, the tire 2 is placed such that the axial direction thereof is parallel to the road surface, and a load is applied to the tire 2 in a direction perpendicular to the road surface. The ground-contact surface 52 shown in FIG. 4 is a ground-contact surface obtained when the load applied to the tire 2 is set to be 30% of the normal load.

In FIG. 4, an alternate long and short dash line LP is a straight line, on the ground-contact surface 52, corresponding to the equator PC of the tire 2. If it is difficult to specify the equator PC on the ground-contact surface 52, the center line in the axial direction of the ground-contact surface 52 is used as the straight line corresponding to the equator PC. A double-headed arrow P100 represents the length of the line of intersection of the ground-contact surface 52 and a plane including the straight line LP. In the tire 2, the length P100 of the line of intersection is an equator ground-contact length measured along the equator PC on the ground-contact surface 52.

In FIG. 4, a solid line LM is a straight line that passes through the axially outer end of the ground-contact surface 52 and that is parallel to the straight line LP. A solid line L70 is a straight line that is located between the straight line LM and the straight line LP and that is parallel to the straight line LM and the straight line LP. A double-headed arrow A100 represents the distance in the axial direction from the straight line LP to the straight line LM. The distance A100 corresponds to half the maximum width of the ground-contact surface 52, that is, the maximum ground-contact width. A double-headed arrow A70 represents the distance in the axial direction from the straight line LP to the straight line L70. In FIG. 4, the ratio of the distance A70 to the distance A100 is set to 70%. That is, the straight line L70 represents a position, on the ground-contact surface 52, corresponding to a width that is 70% of the maximum ground-contact width. A double-headed arrow P70 represents the length of the line of intersection of the ground-contact surface 52 and a plane including the straight line L70. In the tire 2, the length P70 of the line of intersection is a reference ground-contact length at the position, on the ground-contact surface 52, corresponding to the width that is 70% of the maximum ground-contact width.

In the tire 2, the equator ground-contact length P100 and the reference ground-contact length P70 are specified on the ground-contact surface 52 shown in FIG. 4, and a shape index F represented by the ratio (P100/P70) of the equator ground-contact length P100 to the reference ground-contact length P70 is obtained.

In the tire 2, the profile of the tread surface 22 in the tire 2 in the normal state includes the crown circular arc as the circular arc representing the profile of the crown region, and the radius Rc of the crown circular arc is not less than 1600 mm and not greater than 2000 mm.

Since the radius Rc of the crown circular arc is not less than 1600 mm, the contour line at each circumferential direction side of the ground-contact surface 52 is effectively inhibited from bulging in the crown region in the tire 2. Progress of wear in the crown region is inhibited, and thus the entirety of the tread 4 is evenly worn in the tire 2. The tire 2 has excellent uneven wear resistance. From this viewpoint, the radius Rc is preferably not less than 1650 mm.

Since the radius Rc of the crown circular arc is not greater than 2000 mm, occurrence of a peak of contact pressure is inhibited at the boundary PF between the side circular arc and the crown circular arc, that is, at the inflection point, in the tire 2. In the tire 2, good uneven wear resistance is maintained. From this viewpoint, the radius Rc is preferably not greater than 1900 mm, more preferably not greater than 1850 mm, and further preferably not greater than 1800 mm.

Furthermore, in the tire 2, when: the ratio (P100/P70) of the equator ground-contact length P100 measured along the equator PC, to the reference ground-contact length P70 at the position corresponding to the width that is 70% of the maximum ground-contact width, on the ground-contact surface 52 obtained when a load is applied to the tire 2 in the normal state and the tread surface 22 is brought into contact with a flat road surface, is defined as a shape index F; the shape index F obtained when this load is 30% of the normal load is defined as an ultra-light load shape index F30; and the shape index F obtained when this load is 60% of the normal load is defined as a light load shape index F60, the ultra-light load shape index F30 is higher than the light load shape index F60, the ultra-light load shape index F30 is not less than 1.10 and not greater than 1.20, and the light load shape index F60 is not less than 1.04 and not greater than 1.14.

In the tire 2, since the ultra-light load shape index F30 is higher than the light load shape index F60, the degree of bulging, in the crown region, of the contour line at each circumferential direction side of the ground-contact surface 52 is appropriately maintained under load conditions from an ultra-light load to a light load.

In the tire 2, since the ultra-light load shape index F30 is not less than 1.10, the contour line at each circumferential direction side of the ground-contact surface 52 is prevented from being recessed in the crown region under an ultra-light load condition. In the tire 2, progress of wear in a shoulder region is inhibited. From this viewpoint, the ultra-light load shape index F30 is preferably not less than 1.12. Since the ultra-light load shape index F30 is not greater than 1.20, the contour line at each circumferential direction side of the ground-contact surface 52 is also prevented from greatly bulging in the crown region under the ultra-light load condition. In the tire 2, progress of wear in the crown region is inhibited. From this viewpoint, the ultra-light load shape index F30 is preferably not greater than 1.18.

In the tire 2, since the light load shape index F60 is not less than 1.04, the contour line at each circumferential direction side of the ground-contact surface 52 is prevented from being recessed in the crown region under a light load condition. In the tire 2, progress of wear in the shoulder region is inhibited. From this viewpoint, the light load shape index F60 is preferably not less than 1.06. Since the light load shape index F60 is not greater than 1.14, the contour line at each circumferential direction side of the ground-contact surface 52 is also prevented from greatly bulging in the crown region under the light load condition. In the tire 2, progress of wear in the crown region is inhibited. From this viewpoint, the light load shape index F60 is preferably not greater than 1.12.

In the tire 2, the entirety of the tread 4 is evenly worn under the light load condition. The tire 2 has excellent uneven wear resistance under the light load condition and can contribute to improvement of life performance thereof.

In the tire 2, when the shape index F obtained when the load is the normal load is defined as a heavy load shape index F100, preferably, the heavy load shape index F100 is lower than the light load shape index F60, and the heavy load shape index F100 is not less than 1.00 and not greater than 1.10.

In the tire 2, since the heavy load shape index F100 is lower than the light load shape index F60, the degree of bulging, in the crown region, of the contour line at each circumferential direction side of the ground-contact surface 52 is appropriately maintained even under load conditions from a light load to a heavy load.

Furthermore, since the heavy load shape index F100 is not less than 1.00, the contour line at each circumferential direction side of the ground-contact surface 52 is prevented from being recessed in the crown region under a heavy load condition. In the tire 2, progress of wear in the shoulder region is inhibited. From this viewpoint, the heavy load shape index F100 is more preferably not less than 1.02. Since the heavy load shape index F100 is not greater than 1.10, the contour line at each circumferential direction side of the ground-contact surface 52 is also prevented from greatly bulging in the crown region under the heavy load condition. In the tire 2, progress of wear in the crown region is inhibited. From this viewpoint, the heavy load shape index F100 is more preferably not greater than 1.08.

Figure 5:
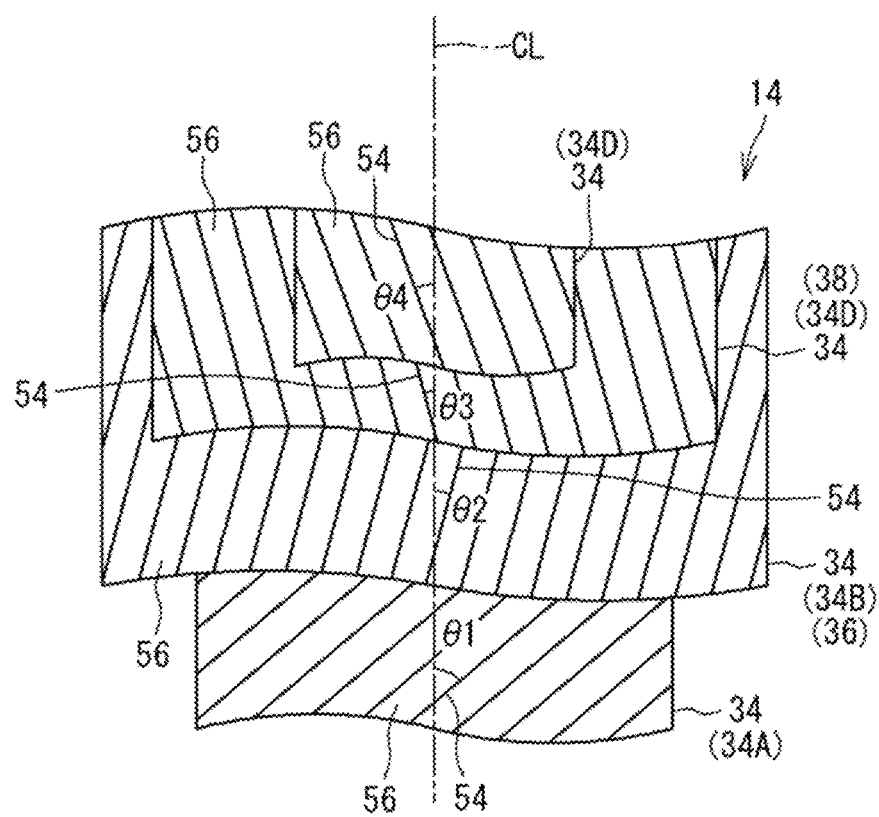
FIG. 5 is a schematic diagram illustrating an arrangement state of belt cords.

FIG. 5 shows the configuration of the belt 14 of the tire 2. In FIG. 5, the right-left direction is the axial direction of the tire 2, and the up-down direction is the circumferential direction of the tire 2.

As described above, each of the layers 34 included in the belt 14 includes a large number of belt cords 54 aligned with each other. These belt cords 54 are covered with a topping rubber 56. In FIG. 5, for convenience of description, the belt cords 54 covered with the topping rubber 56 are represented by solid lines.

The belt cords 54 are inclined relative to the equator plane CL. In the tire 2, each of the layers 34 included in the belt 14 includes the large number of belt cords 54 inclined relative to the equator plane CL.

As shown in FIG. 5, the direction in which the belt cords 54 of the first layer 34A are inclined relative to the circumferential direction is the same as the direction in which the belt cords 54 of the second layer 34B are inclined relative to the circumferential direction. The direction in which the belt cords 54 of the second layer 34B are inclined relative to the circumferential direction is opposite to the direction in which the belt cords 54 of the third layer 34C are inclined relative to the circumferential direction. The direction in which the belt cords 54 of the third layer 34C are inclined relative to the circumferential direction is the same as the direction in which the belt cords 54 of the fourth layer 34D are inclined relative to the circumferential direction. The direction in which the belt cords 54 of the first layer 34A are inclined relative to the circumferential direction may be opposite to the direction in which the belt cords 54 of the second layer 34B are inclined relative to the circumferential direction, and the direction in which the belt cords 54 of the fourth layer 34D are inclined relative to the circumferential direction may be opposite to the direction in which the belt cords 54 of the third layer 34C are inclined relative to the circumferential direction. From the viewpoint of ensuring a stable ground-contact shape, the direction in which the belt cords 54 of the second layer 34B, that is, the first reference layer 36, are inclined relative to the circumferential direction is preferably opposite to the direction in which the belt cords 54 of the third layer 34C, that is, the second reference layer 38, are inclined relative to the circumferential direction.

In FIG. 5, an angle $\theta1$ is the inclination angle of the belt cords 54 included in the first layer 34A relative to the equator plane CL. An angle $\theta2$ is the inclination angle of the belt cords 54 included in the second layer 34B relative to the equator plane CL. An angle $\theta3$ is the inclination angle of the belt cords 54 included in the third layer 34C relative to the equator plane CL. An angle $\theta4$ is the inclination angle of the belt cords 54 included in the fourth layer 34D relative to the equator plane CL.

In the tire 2, from the viewpoint that the second layer 34B, that is, the first reference layer 36, can effectively restrain movement of the tire 2 and contribute to ensuring a stable ground-contact shape, the inclination angle $\theta2$ of the belt cords 54 in the second layer 34B is preferably not less than 14° and preferably not greater than 17°.

In the tire 2, from the viewpoint that the third layer 34C, that is, the second reference layer 38, can effectively restrain movement of the tire 2 and contribute to ensuring a stable ground-contact shape, the inclination angle $\theta3$ of the belt cords 54 in the third layer 34C is preferably not less than 14° and preferably not greater than 17°.

Furthermore, in the tire 2, from the viewpoint that the first layer 34A can effectively restrain movement of the tire 2 and contribute to ensuring a stable ground-contact shape, the inclination angle $\theta1$ of the belt cords 54 in the first layer 34A is preferably not less than 48° and preferably not greater than 53°.

In the tire 2, from the viewpoint that the fourth layer 34D can effectively restrain movement of the tire 2 and contribute to ensuring a stable ground-contact shape, the inclination angle $\theta4$ of the belt cords 54 in the fourth layer 34D is preferably not less than 14° and preferably not greater than 23°.

From the viewpoint of improvement of uneven wear resistance, in the tire 2, more preferably, the inclination angle $\theta2$ of the belt cords 54 in the second layer 34B, which is the first reference layer 36, is not less than 14° and not greater than 17°, and the inclination angle $\theta3$ of the belt cords 54 in the third layer 34C, which is the second reference layer 38, is not less than 14° and not greater than 17°. From the same viewpoint, in the tire 2, further preferably, the inclination angle $\theta1$ of the belt cords 54 in the first layer 34A is not less than 48° and not greater than 53°, the inclination angle $\theta2$ of the belt cords 54 in the second layer 34B is not less than 14° and not greater than 17°, the inclination angle $\theta3$ of the belt cords 54 in the third layer 34C is not less than 14° and not greater than 17°, and the inclination angle $\theta4$ of the belt cords 54 in the fourth layer 34D is not less than 14° and not greater than 23°.

Figure 6:
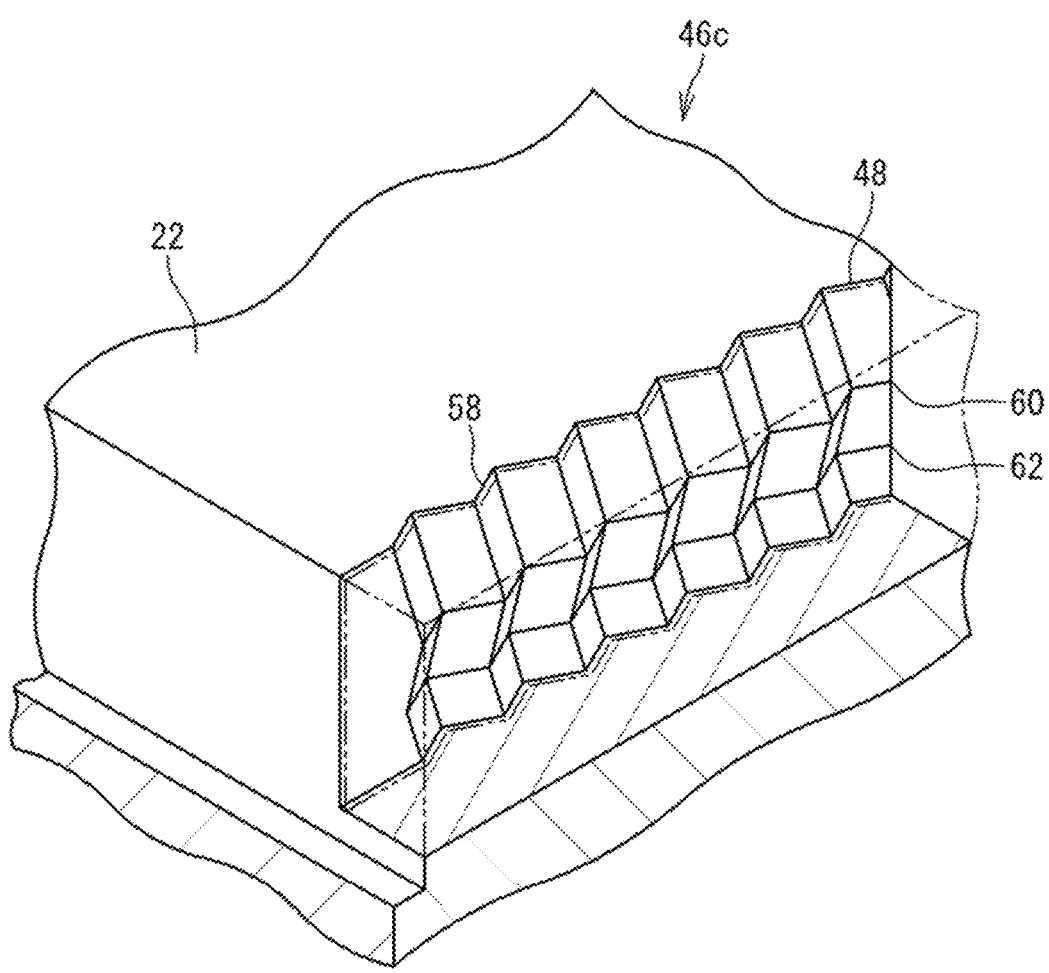
FIG. 6 is a perspective view showing a wall surface of a sipe formed on a tread.

As described above, in the tire 2, the sipe 48 is formed on each of the maximum width portions of the crown blocks 46c and the maximum width portions of the middle blocks 46m. FIG. 6 shows a wall surface of the sipe 48 provided on the crown block 46c. Although not shown, the sipe 48 on each middle block 46m also has the same configuration as the configuration of the sipe 48 on the crown block 46c.

The sipe 48 is open on the tread surface 22. The edge shape of the opening of the sipe 48 has a zigzag portion 58 that extends in a zigzag manner by repeating peaks and valleys. The sipe 48 retains the zigzag portion 58 from the tread surface 22 toward the bottom thereof, and extends while displacing the zigzag portion 58 to one side and the other side in the longitudinal direction of the sipe 48. In other words, first displacement portions 60 in each of which the position of the zigzag portion 58 is displaced to one side in the longitudinal direction of the sipe 48, and second displacement portions 62 in each of which the position of the zigzag portion 58 is displaced to the other side in the longitudinal direction of the sipe 48, are repeated in the depth direction of the sipe 48. In the tire 2, the wall surface of the sipe 48 forms a three-dimensional uneven curved surface obtained by combining parallelograms.

The sipe 48 is also referred to as a 3D sipe. In the sipe 48, the recesses and projections of the opposing wall surfaces are in mesh with each other, and thus falling-down of the crown block 46c is effectively inhibited. Since the sipe 48 on each middle block 46m is also the same 3D sipe, falling-down of the middle block 46m is also effectively inhibited. In the tire 2, deformation of each crown block 46c and each middle block 46m due to application of a load is inhibited. In the tire 2, progress of wear in the crown region is inhibited. From this viewpoint, in the tire 2, preferably, sipes 48 are formed on each of the middle land portions 42m and the crown land portion 42c so as to traverse the land portion 42; in each sipe 48, the edge shape of the opening open on the tread surface 22 has a zigzag portion 58 that extends in a zigzag manner by repeating peaks and valleys; and, in the depth direction of the sipe 48, the edge shape of the opening is substantially retained, and first displacement portions 60 in each of which the position of the zigzag portion 58 is displaced to one side in the longitudinal direction of the sipe 48, and second displacement portions 62 in each of which the position of the zigzag portion 58 is displaced to the other side in the longitudinal direction of the sipe 48, are repeated.

In FIG. 1, a solid line EL is a normal line of the outer surface of the carcass 12 that passes through the end PE of the tread surface 22. A double-headed arrow TE represents the thickness of the tire 2 measured along the normal line EL of the carcass 12. The normal line EL traverses a portion at the shoulder land portion 42s of the tire 2. The thickness TE is the thickness of the tire 2 at the end PE of the tread surface 22.

In the tire 2, the thickness measured along the normal line of the carcass 12 shows the maximum at the normal line EL of the carcass 12 passing through the end PE of the tread surface 22. In the tire 2, the portion at the shoulder land portion 42s is the thickest.

In FIG. 1, a double-headed arrow TC is the thickness of the tire 2 measured along a normal line of the carcass 12 that passes through the equator PC. The thickness TC is the thickness of the tire 2 at the equator PC. In the tire 2, from the viewpoint of being able to improve uneven wear resistance while maintaining good steering stability, the ratio (TE/TC) of the thickness TE of the tire 2 at the end PE of the tread surface 22 to the thickness TC at the equator PC is preferably not less than 1.30 and preferably not greater than 1.35.

In FIG. 1, a solid line LG is a straight line that passes through the bottom of the shoulder circumferential groove 40s and that extends in the radial direction. A double-headed arrow G represents the distance in the axial direction from the equator plane CL to the straight line LG. The distance G is the distance in the axial direction from the equator plane CL to the bottom of the shoulder circumferential groove 40s. A double-headed arrow K represents the distance in the axial direction from the equator plane CL to the end PE of the tread surface 22. A double-headed arrow J represents the distance in the axial direction from the equator plane CL to the end of the belt 14.

In the tire 2, the ratio (G/K) of the distance G in the axial direction from the equator plane CL to the bottom of the shoulder circumferential groove 40s, to the distance K in the axial direction from the equator plane CL to the end PE of the tread surface 22, is preferably not less than 0.50 and preferably not greater than 0.70.

When the ratio (G/K) is set to be not less than 0.50, the width of the crown land portion 42c is appropriately maintained. The shoulder land portion 42s is prevented from having stiffness excessively higher than the stiffness of the crown land portion 42c, and thus progress of wear in the shoulder region is inhibited. From this viewpoint, the ratio (G/K) is more preferably not less than 0.53 and further preferably not less than 0.55.

When the ratio (G/K) is set to be not greater than 0.70, the width of the shoulder land portion 42s is appropriately maintained. The crown land portion 42c is prevented from having stiffness excessively higher than the stiffness of the shoulder land portion 42s, and thus progress of wear in the crown region is inhibited. From this viewpoint, the ratio (G/K) is more preferably not greater than 0.67 and further preferably not greater than 0.65.

In the tire 2, each end of the belt 14, more specifically, each end of the second layer 34B, is preferably located outward of the bottom of the shoulder circumferential groove 40s in the axial direction. Accordingly, the belt 14 can contribute to improvement of the stiffness of the portion at the shoulder land portion 42s. In the tire 2, progress of wear in the shoulder region is inhibited. From this viewpoint, not only each end of the second layer 34B but also each end of the third layer 34C is more preferably located outward of the bottom of the shoulder circumferential groove 40s in the axial direction. Not only each end of the second layer 34B and each end of the third layer 34C but also each end of the first layer 34A is further preferably located outward of the bottom of the shoulder circumferential groove 40s in the axial direction.

In the tire 2, from the viewpoint of being able to inhibit progress of wear in the shoulder region to improve uneven wear resistance, the ratio (J/G) of the distance J in the axial direction from the equator plane CL to the end of the belt 14, to the distance G in the axial direction from the equator plane CL to the bottom of the shoulder circumferential groove 40s, is preferably not less than 1.30 and more preferably not less than 1.35. From the viewpoint of preventing occurrence of damage at the end of the belt 14, the ratio (J/G) is preferably not greater than 1.50 and more preferably not greater than 1.45.

In FIG. 3, a double-headed arrow WC represents the width of the crown land portion 42c. A double-headed arrow WM represents the width of the middle land portion 42m. A double-headed arrow WS represents the width of the shoulder land portion 42s.

In the tire 2, from the viewpoint of ensuring stiffness in the crown region and particularly inhibiting progress of wear in the crown region under the light load condition, the ratio (WS/WC) of the width WS of the shoulder land portion 42s to the width WC of the crown land portion 42c is preferably lower than the ratio (WM/WC) of the width WM of the middle land portion 42m to the width WC of the crown land portion 42c. In this case, from the viewpoint of effectively inhibiting progress of wear in the crown region, the ratio (WM/WC) is preferably not less than 0.95 and more preferably not less than 0.97. From the viewpoint of effectively inhibiting progress of wear in the shoulder region, the ratio (WM/WC) is preferably not greater than 1.05 and more preferably not greater than 1.03. From the viewpoint of effectively inhibiting progress of wear in the shoulder region, the ratio (WS/WC) is preferably not less than 0.85 and more preferably not less than 0.87. From the viewpoint of effectively inhibiting progress of wear in the crown region, the ratio (WS/WC) is preferably not greater than 0.95 and more preferably not greater than 0.92.

In FIG. 3, a double-headed arrow C represents the thickness from the profile of the belt 14 to the profile of the tread surface 22 at the equator plane CL. A double-headed arrow F represents the thickness from the profile of the belt 14 to the profile of the tread surface 22 at the end of the belt 14. A reference character MC represents the center of the middle land portion 42m on the profile of the tread surface 22. A double-headed arrow D represents the thickness from the profile of the belt 14 to the center MC of the middle land portion 42m. A reference character SE represents the position, on the profile of the tread surface 22, corresponding to the edge of the shoulder land portion 42s at the minimum width portion of the shoulder land portion 42s. A double-headed arrow E represents the thickness from the profile of the belt 14 to the edge SE of the shoulder land portion 42s. The thickness C, the thickness F, the thickness D, and the thickness E are each measured along a normal line of the profile of the belt 14.

In the tire 2, the difference (F−C) between the thickness F from the profile of the belt 14 to the profile of the tread surface 22 at the end of the belt 14 and the thickness C from the profile of the belt 14 to the profile of the tread surface 22 at the equator plane CL is preferably not less than 0.0 mm and more preferably not less than 0.5 mm. Accordingly, the ground-contact length of the tire 2 in the crown region is maintained at an appropriate length. In the tire 2, progress of wear in the crown region is inhibited. From the viewpoint of maintaining the ground-contact length of the tire 2 in the shoulder region at an appropriate length and inhibiting progress of wear in the shoulder region, the difference (F−C) is preferably not greater than 2.0 mm and more preferably not greater than 1.5 mm.

In the tire 2, from the viewpoint of maintaining the ground-contact length of the tire 2 in a middle region at an appropriate length and inhibiting progress of wear in the middle region, the ratio (D/E) of the thickness D from the profile of the belt 14 to the center MC of the middle land portion 42m, to the thickness E from the profile of the belt 14 to the edge SE of the shoulder land portion 42s, is preferably not less than 0.92 and preferably not greater than 1.0.

As is obvious from the above description, in the heavy duty tire 2 according to the present invention, the entirety of the tread 4 is evenly worn under the light load condition. The tire 2 has excellent uneven wear resistance under the light load condition and can contribute to improvement of life performance thereof. The present invention exhibits a remarkable effect in the heavy duty tire 2 having an aspect ratio of not less than 75% and not greater than 90%.

EXAMPLES

The following will describe the present invention in further detail by means of an example, etc., but the present invention is not limited to the example.

Example 1

A heavy duty tire (size=295/75R22.5) having the structure shown in FIG. 1 and having specifications shown in Table 1 was obtained.

In Example 1, the radius Rc of the crown circular arc was 1695 mm. The ultra-light load shape index F30 was 1.13. The light load shape index F60 was 1.08. The heavy load shape index F100 was 1.04. The inclination angle θ2 of the belt cords included in the first reference layer of the belt and the inclination angle θ3 of the belt cords included in the second reference layer of the belt were each 15° (degrees). 3D sipes were formed on the blocks formed in the crown land portion and each middle land portion. This is represented as "Y" in the cell for "3D sipe" in Table 1. The ratio (WM/WC) of the width WM of the middle land portion to the width WC of the crown land portion was 0.98. The ratio (WS/WC) of the width WS of the shoulder land portion to the width WC of the crown land portion was 0.89. The ratio (TE/TC) of the thickness TE of the tire at the end PE of the tread surface to the thickness TC at the equator PC was 1.34.

Comparative Example 1

A tire of Comparative Example 1 was obtained in the same manner as Example 1, except that the radius Rc, the ultra-light load shape index F30, the light load shape index F60, the inclination angle θ2, the inclination angle θ3, the ratio (WM/WC), the ratio (WS/WC), and the ratio (TE/TC) were as shown in Table 1 below, and no 3D sipes were provided on the blocks formed in the crown land portion and each middle land portion. The tire of Comparative Example 1 is a conventional tire. In Comparative Example 1, the heavy load shape index F100 was not measured. No 3D sipes being formed is represented as "N" in the cell for "3D sipe" in Table 1.

[Uneven Wear Resistance in Light Load Range]

A test tire was fitted onto a rim (size=8.25×22.5) and inflated with air to adjust the internal pressure to 750 kPa. The tire was mounted to the first drive shaft of a trailer head. A load applied to the tire was set to 60% of the normal load. The trailer was caused to run for 100,000 km without changing the tire position. After the running, a wear amount Cr of the crown land portion and a wear amount Sh of the shoulder land portion were measured, and the ratio (Cr/Sh) of the wear amount Cr of the crown land portion to the wear amount Sh of the shoulder land portion was obtained. The result is shown in the cell for "Cr/Sh of light load range" in Table 1 below. The ratio (Cr/Sh) closer to 1.00 represents that the entirety of the tread is more evenly worn.

[Life Performance in Light Load Range]

A test tire was fitted onto a rim (size=8.25×22.5) and inflated with air to adjust the internal pressure to 750 kPa. The tire was mounted to the first drive shaft of a trailer head. A load applied to the tire was set to 60% of the normal load. The running distance was measured until the crown land portion was worn by 40% without changing the tire position. The result is shown as an index in the cell for "life of light load range" in Table 1 below. The index having a higher value represents that the life of the tire is longer and the frequency of replacement of the tire is lower.

[Uneven Wear Resistance in Range from Ultra-Light Load to Light Load]

A test tire was fitted onto a rim (size=8.25×22.5) and inflated with air to adjust the internal pressure to 750 kPa. The tire was mounted to the first drive shaft of a trailer head. A load applied to the tire was set to 60% of the normal load, and the trailer was caused to run for 10,000 km. Then, the load applied to the tire was set to 30% of the normal load, and the trailer was caused to run for 10,000 km. This cycle was repeated five times without changing the tire position. After the running, a wear amount Cr of the crown land portion and a wear amount Sh of the shoulder land portion were measured, and the ratio (Cr/Sh) of the wear amount Cr of the crown land portion to the wear amount Sh of the shoulder land portion was obtained. The result is shown in the cell for "Cr/Sh of range from ultra-light load to light load" in Table 1 below. The ratio (Cr/Sh) closer to 1.00 represents that the entirety of the tread is more evenly worn.

TABLE 1

|  |  | Comparative Example 1 | Example 1 |
|---|---|---|---|
| Rc [mm] |  | 1500 | 1695 |
| F30 [-] |  | 1.39 | 1.13 |
| F60 [-] |  | 1.22 | 1.08 |
| F100 [-] |  | — | 1.04 |
| θ2 [°] |  | 18 | 15 |
| θ3 [°] |  | 18 | 15 |
| 3D sipe |  | N | Y |
| WM/WC [-] |  | 0.92 | 0.98 |
| WS/WC [-] |  | 0.83 | 0.89 |
| TE/TC [-] |  | 1.39 | 1.34 |
| Light load range | Cr/Sh | 1.20 | 1.07 |
|  | Life | 100 | 108 |
| Range from ultra-light load to light load | Cr/Sh | 1.29 | 1.11 |

As shown in Table 1, it was confirmed that, in the Example, as compared to the Comparative Example, the entirety of the tread is evenly worn under the light load condition, the uneven wear resistance is good under the light load condition, and the life performance is improved. In addition, it was confirmed that when running under the ultra-light load condition and running under the light load condition were performed, in the Example, as compared to the Comparative Example, progress of wear in the crown region is inhibited, and the entirety of the tread is evenly worn. Furthermore, it was also confirmed that, regarding the ratio (Cr/Sh) of the wear amount Cr of the crown land portion to the wear amount Sh of the shoulder land portion, focusing on the difference between the ratio (Cr/Sh) in the running test in which running under the ultra-light load condition and running under the light load condition were performed and the ratio (Cr/Sh) in the running test under the light load condition, the difference in the Comparative Example is 0.09 points, but the difference in the Example is only 0.04 points, and the change margin due to the difference in load condition is small in the Example. From the above evaluation results, advantages of the present invention are clear.

INDUSTRIAL APPLICABILITY

The above-described technology to evenly wear the entirety of a tread under a light load condition can be applied to various tires.

REFERENCE SIGNS LIST 2 heavy duty tire
4 tread
6 sidewall
8 bead
10 chafer
12 carcass
14 belt
18 inner liner
22 tread surface
32 carcass ply
34, 34A, 34B, 34C, 34D layer
36 first reference layer
38 second reference layer
40, 40s, 40m circumferential groove
42, 42s, 42m, 42c land portion
48 sipe
52 ground-contact surface
54 belt cord
58 zigzag portion

The invention claimed is:

1. A heavy duty tire comprising a tread having a tread surface that comes into contact with a road surface, wherein
in the tire in a normal state where the tire is mounted on a normal rim, an internal pressure of the tire is adjusted to a normal internal pressure, and no load is applied to the tire, a profile of the tread surface includes a crown circular arc as a circular arc representing a profile of a portion including an equator, and the crown circular arc has a radius of not less than 1600 mm and not greater than 2000 mm, and
when a ratio of an equator ground-contact length measured along the equator, to a reference ground-contact length at a position corresponding to a width that is 70% of a maximum ground-contact width, on a ground-contact surface obtained when a load is applied to the tire in the normal state and the tread surface is brought into contact with a flat road surface, is defined as a shape index, the shape index obtained when the load is 30% of a normal load is defined as an ultra-light load shape index, and the shape index obtained when the load is 60% of the normal load is defined as a light load shape index,
the ultra-light load shape index is higher than the light load shape index, the ultra-light load shape index is not less than 1.10 and not greater than 1.20, and the light load shape index is not less than 1.04 and not greater than 1.14.

2. The heavy duty tire according to claim 1, wherein
when the shape index obtained when the load is the normal load is defined as a heavy load shape index,
the heavy load shape index is lower than the light load shape index, and the heavy load shape index is not less than 1.00 and not greater than 1.10.

3. The heavy duty tire according to claim 1, further comprising a belt located inward of the tread in a radial direction, wherein
the belt includes a plurality of layers stacked in the radial direction, and each of the layers includes a large number of belt cords aligned with each other,
the plurality of layers include a first reference layer having a largest width in an axial direction, and a second reference layer stacked radially outward of the first reference layer, and
an angle of the belt cords in each of the first reference layer and the second reference layer relative to an equator plane is not less than 14° and not greater than 17°.

4. The heavy duty tire according to claim 1, wherein
at least four circumferential grooves aligned in an axial direction are formed on the tread, thereby forming at least five land portions,
among the at least five land portions, land portions including ends of the tread surface are shoulder land portions, land portions located inward of the shoulder land portions in the axial direction are middle land portions, and a land portion located inward of the middle land portions in the axial direction is a crown land portion, a ratio of a width of each middle land portion to a width of the crown land portion is not less than 0.95 and not greater than 1.05, and a ratio of a width of each shoulder land portion to the width of the crown land portion is not less than 0.85 and not greater than 0.95.

5. The heavy duty tire according to claim 4, wherein on each of the middle land portions and the crown land portion, a sipe is formed so as to traverse the land portion, in the sipe, an edge shape of an opening open on the tread surface has a zigzag portion that extends in a zigzag manner by repeating peaks and valleys, and in a depth direction of the sipe, the edge shape of the opening is substantially retained, and first displacement portions in each of which a position of the zigzag portion is displaced to one side in a longitudinal direction of the sipe and second displacement portions in each of which the position of the zigzag portion is displaced to another side in the longitudinal direction of the sipe are repeated.

6. The heavy duty tire according to claim 1, wherein a ratio of a thickness of the tire at each end of the tread surface to a thickness of the tire at the equator is not less than 1.30 and not greater than 1.35.

7. The heavy duty tire according to claim 3, wherein a direction in which the belt cords of the first reference layer are inclined relative to a circumferential direction is opposite to a direction in which the belt cords of the the second reference layer are inclined relative to the circumferential direction.

8. The heavy duty tire according to claim 3, wherein a difference between a thickness from a profile of the belt to the profile of the tread surface at an end of the belt and a thickness from the profile of the belt to the profile of the tread surface at the equator plane is not less than 0.0 mm and not greater than 2.0 mm.

9. The heavy duty tire according to claim 4, wherein the profile of the tread surface includes a side circular arc as a circular arc representing a profile of each of portions axially outward of the portion including the equator, and the ratio of a radius of the side circular arc to the radius of the crown circular arc is not less than 0.2 and not greater than 0.4.

10. The heavy duty tire according to claim 2, further comprising a belt located inward of the tread in a radial direction, wherein the belt includes a plurality of layers stacked in the radial direction, and each of the layers includes a large number of belt cords aligned with each other, the plurality of layers include a first reference layer having a largest width in an axial direction, and a second reference layer stacked radially outward of the first reference layer, and an angle of the belt cords in each of the first reference layer and the second reference layer relative to an equator plane is not less than 14° and not greater than 17°.

11. The heavy duty tire according to claim 2, wherein at least four circumferential grooves aligned in an axial direction are formed on the tread, thereby forming at least five land portions, among the at least five land portions, land portions including ends of the tread surface are shoulder land portions, land portions located inward of the shoulder land portions in the axial direction are middle land portions, and a land portion located inward of the middle land portions in the axial direction is a crown land portion, a ratio of a width of each middle land portion to a width of the crown land portion is not less than 0.95 and not greater than 1.05, and a ratio of a width of each shoulder land portion to the width of the crown land portion is not less than 0.85 and not greater than 0.95.

12. The heavy duty tire according to claim 2, wherein a ratio of a thickness of the tire at each end of the tread surface to a thickness of the tire at the equator is not less than 1.30 and not greater than 1.35.

* * * * *